Dec. 25, 1928.  
W. H. BAKER  
1,696,831  
COMBINED GRAMOPHONE AND MOTION PICTURE APPARATUS  
Original Filed Jan. 7, 1921   3 Sheets-Sheet 1

Inventor  
William H. Baker  
By Fetherstonhaugh & Co.  
Attys.

Dec. 25, 1928.                                                1,696,831
W. H. BAKER
COMBINED GRAMOPHONE AND MOTION PICTURE APPARATUS
Original Filed Jan. 7, 1921    3 Sheets-Sheet 2

Inventor
William H. Baker
By
Attys.

Dec. 25, 1928.　　　　　　　　　　　　　　　1,696,831
W. H. BAKER
COMBINED GRAMOPHONE AND MOTION PICTURE APPARATUS
Original Filed Jan. 7, 1921　　3 Sheets-Sheet 3
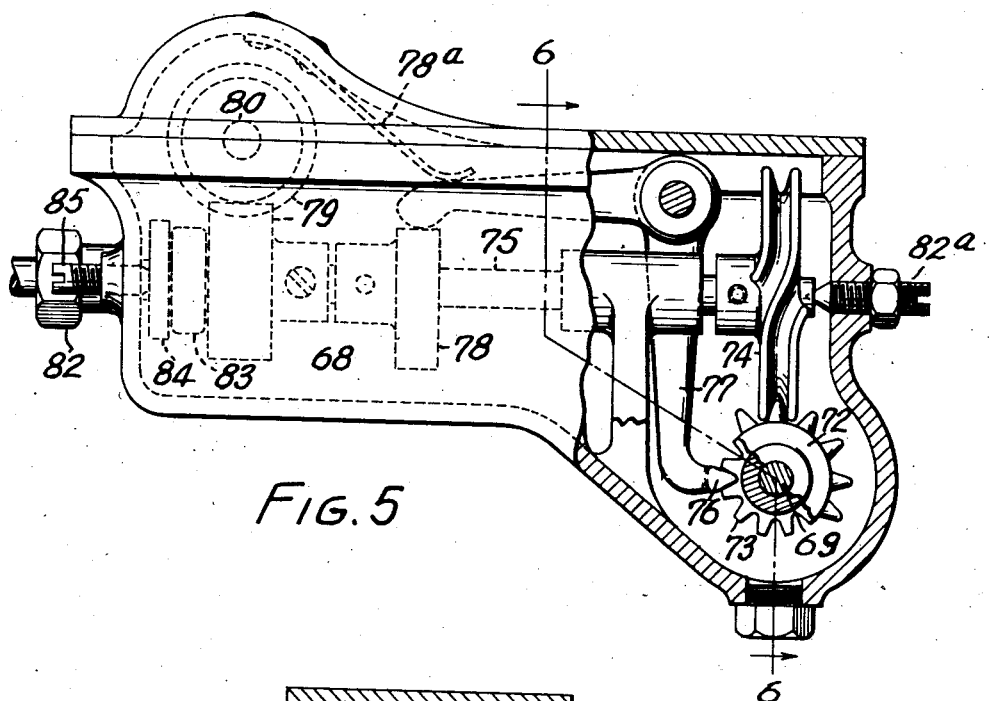
FIG. 5
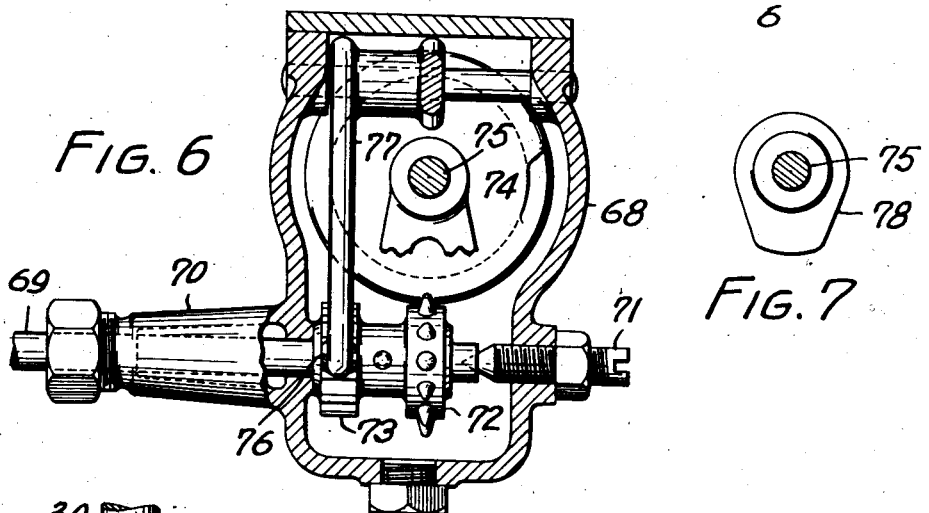
FIG. 6
FIG. 7
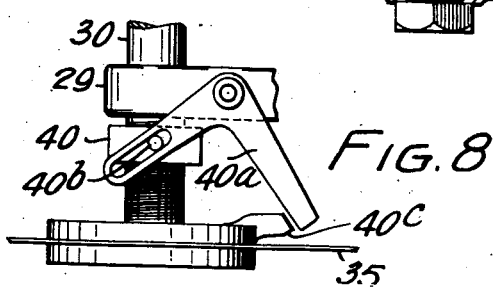
FIG. 8
Inventor
William H. Baker
By
Fetherstonhaugh & Co.
Attys.

Patented Dec. 25, 1928.

1,696,831

UNITED STATES PATENT OFFICE.

WILLIAM H. BAKER, OF MONTREAL, QUEBEC, CANADA.

COMBINED GRAMOPHONE AND MOTION-PICTURE APPARATUS.

Application filed January 7, 1921, Serial No. 435,712. Renewed May 22, 1928.

This invention relates to improvements in apparatus in which a gramophone and a motion picture machine are combined and arranged for synchronous operation, and the object of the invention is to provide a durable and easily operated machine.

A further object is to provide a machine of the character referred to adapted to utilize a circular film on which the pictures are arranged in a spiral.

A further object is to provide improved means for shifting the film in a manner to avoid flickering of the projected picture due to vibration.

Another object is to provide means for automatically resetting the projecting apparatus to a predetermined starting point.

Various other objects and advantages will be apparent from the following description.

The invention resides broadly in providing in a single cabinet a gramophone of any suitable construction and a projecting apparatus, the cover of the cabinet being arranged to serve as a projecting screen. The picture is projected upwardly from the lower part of the cabinet to a mirror, from whence it is reflected on to the screen. Both the projecting apparatus and gramophone may be driven by the same motor, preferably an electric one. The film is mounted on the upper end of a revoluble spindle carried by a swinging arm, and at the lower end of the spindle a disc is provided having a plurality of apertures therein arranged in a spiral and centered in accordance with the centering of pictures on the film. Suitable driving gear is provided engaging the apertured disc to revolve the same and at the same time to gradually swing the arm, so as to bring the different convolutions of the picture spiral in alignment with a fixed projecting point.

In the drawings which illustrate the invention:—

Fig. 5 is a front elevation of the controlling gear of the projecting apparatus, a part of the casing being broken away.

Fig. 6 is a cross section on the line 6—6, Figure 5.

Fig. 7 is a plan view of a cam in the driving gear.

Fig. 8 is a detail elevation of an alternative form of resetting stop.

Figures 1, 4:
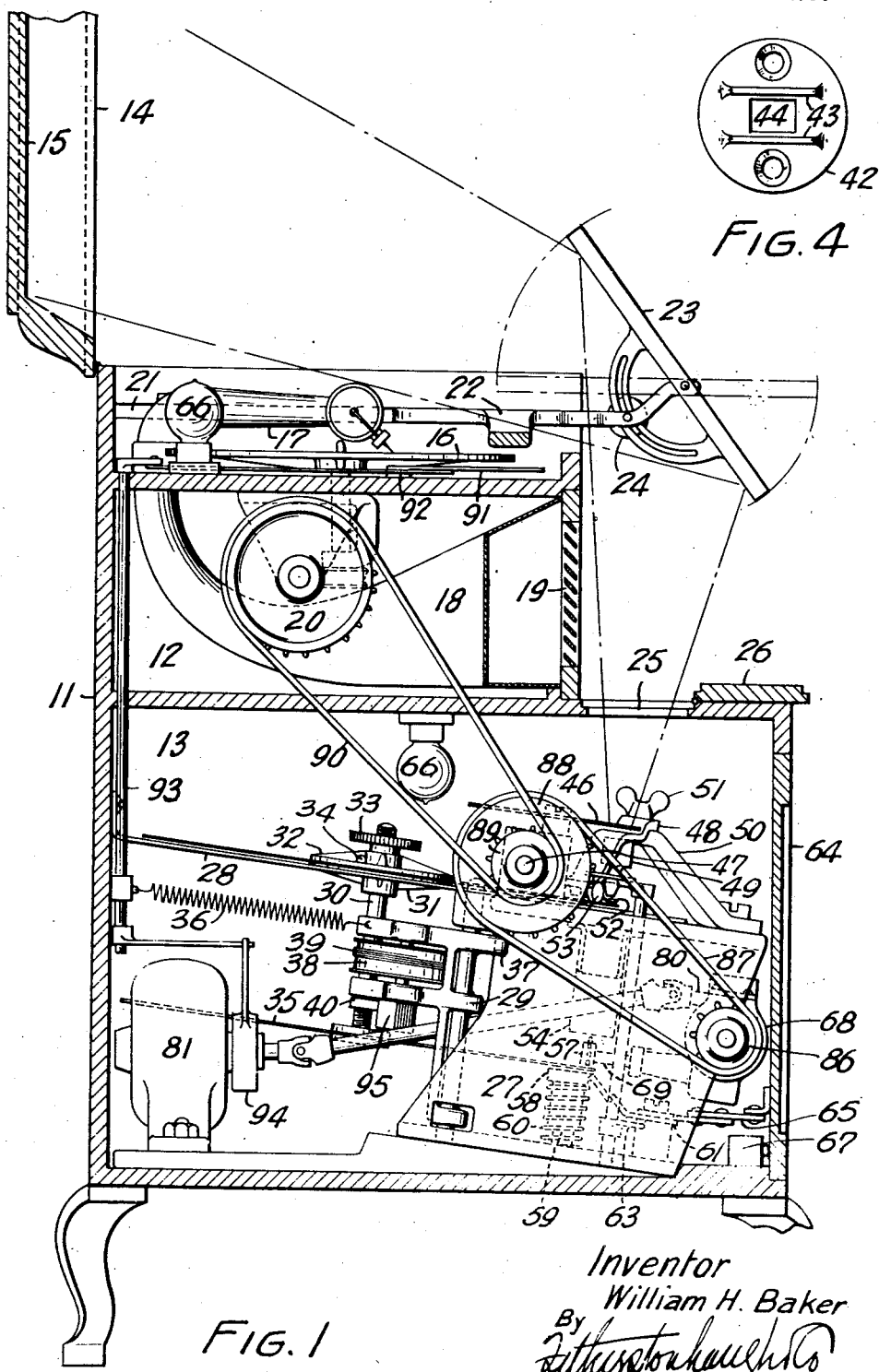
Fig. 1 is a side elevation of the device, the casing being broken away.
Fig. 4 is an enlarged plan view of the film support at the projecting point.
Figure 2:
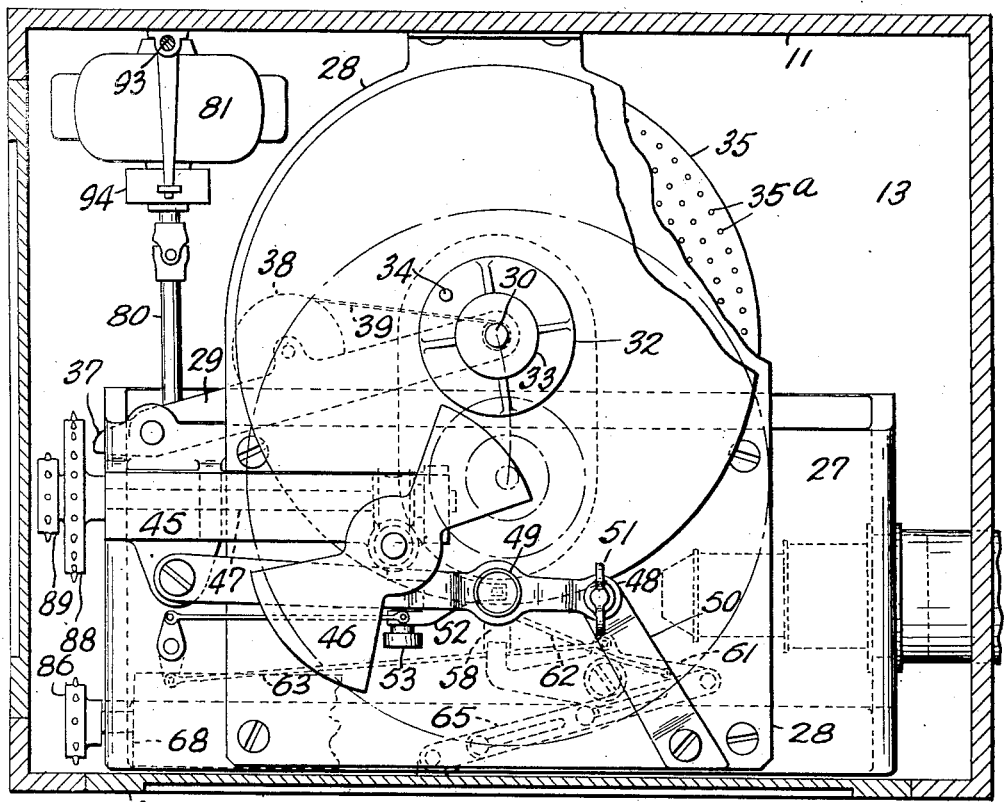
Fig. 2 is a plan view of the projecting apparatus.

Referring more particularly to the drawings, 11 designates a casing divided into upper and lower compartments 12 and 13 respectively, the upper compartment being provided with a hinged cover 14, the inside surface 15 of which is a screen upon which pictures may be projected. The upper compartment 12 is constructed substantially as an ordinary gramophone, being provided with a revoluble record carrying table 16, a tone arm 17 and a horn 18, the mouth of which is preferably closed by an ornamental or slatted door 19 at the front of the compartment. The record table 16 is driven in any suitable way from a gear 20. Grooves or guides 21 are provided in the opposite side walls of the compartment 12 near the top thereof and slidably receive a light frame 22 carrying at its forward end a pivotally mounted mirror 23, the position of which relative to the frame may be fixed by means of any suitable releasable locking device 24.

The lower compartment 13 projects forwardly of the upper compartment and the top of this forwardly projecting portion is provided with an opening 25 having a closure member 26. The position of the opening 25 is such that the mirror frame 22 may be drawn forwardly to position the mirror over the opening, and the mirror then angularly adjusted to reflect a beam of light issuing from the opening 25 upon the inner surface 15 of the open cover 14, as illustrated in Figure 1.

In the lower compartment 13, the frame 27 of a projecting apparatus is mounted, this frame being of any suitable shape. An apertured film table 28 is provided extending over the top of the frame and to the back of the cabinet, the upper surface of this table being highly polished to reduce wear and friction between a moving film and the table. At one end of the frame, an arm 29 is pivotally mounted, the free extremity of said arm being adapted to swing approximately under the centre of the table 28 and being provided with a revoluble spindle 30, the upper end of which projects through the table 28 and carries a clamping plate 31, the upper surface of which is substantially in the same plane as the upper surface of the table. A second similar clamping plate 32 is provided to hold a film down on the plate 31, this latter plate being secured by a nut 33 screwing on the upper end of the spindle 30. The lower plate 31 is provided with a single eccentrically disposed pin 34 adapted to project through an aperture in a film and through the plate 32, thus holding both the film and plate against revolution independently of the spindle and also serving to ensure a certain predetermined relation between the film and the spindle. The film used with this apparatus is circular and the pictures thereon are arranged in a spiral path. The lower end of the spindle 30 carries rigidly connected thereto a disc 35 preferably of fibre. This disc is provided with a series of apertures $35^a$ arranged in a spiral path and centered in accordance with the centering of the pictures on the film. The purpose of the pin 34 is both to hold the film against revolution independently of the disc and to ensure the positioning of the film in proper relation to the apertures of the disc 35. In the present form of machine, the disc shifting means is directly under the projecting means and therefore the pin 34 determines the position of the first picture on the film as directly over the first aperture of the disc, but this particular relation is not essential as the shifting mechanism may be located to one side of or opposite the projecting lens. In order to normally position the outmost convolution of the picture spiral in position for projecting and the outmost convolution of apertures $35^a$ in engagement with the shifting mechanism, a spring 36 is connected between the arm and any suitably fixed point in the machine and a stop 37 is provided to limit the movement of the arm 29 by the urgence of the spring. In order to normally bring the end picture of the outermost convolution and the end aperture of the outermost convolution of the film and disc 35 respectively to the predetermined points, a spring drum 38 is mounted in the arm 29 and has wound thereon a flexible member such as a cord 39, one end of which is fixed to the spindle 30 so that revolution of the spindle will wind up the cord and revolve the drum 38 to tension the spring therein which will, when suitably released, unwind and revolve the spindle to bring the end picture and end aperture to the desired points. In order to stop the revolution of the disc and film when the starting point is reached, the lower end of the spindle is threaded and carries an irrevolubly mounted nut 40, which therefore works up and down on the spindle with spindle revolution. When the starting point is reached, the nut reaches the upper end of its travel and abuts the arm 29 and so stops revolution of the spindle. The same effect may be obtained without abutment of the nut and arm if the spindle thread is coarse and ends abruptly, or by means of the mechanism shown in Figure 8. In the construction shown, a bell crank lever $40^a$ is pivotally mounted on the arm 29, one end being slotted to engage a post $40^b$ carried by the nut 40 and the other arm being adapted to move into and out of the path of a stop or arm $40^c$ rigidly connected to the spindle 30. Vertical travel of the nut 40, due to revolution of the spindle 30, oscillates the arm $40^a$ so that when the film and disc are in the starting position the nut is at one end of its travel, and brings the lever $40^a$ into the path of the arm $40^c$ to check revolution of the disc and film past the starting point. In the normal operation of the machine, the movement of the nut produced by one revolution of the spindle shifts the lever sufficiently to clear the arm $40^c$, as will be readily understood.

Figure 3:
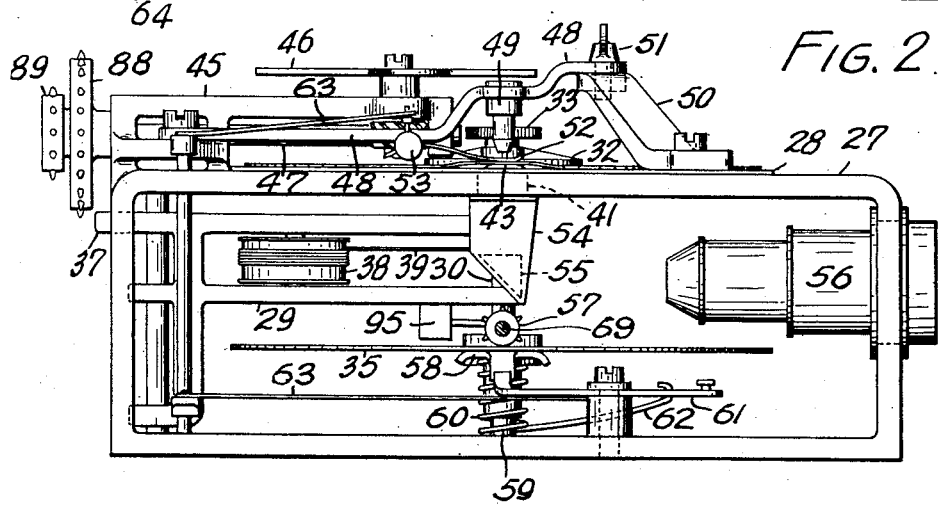
Fig. 3 is a front elevation of the projecting apparatus.

The frame is provided with a suitably disposed light opening 41 adapted to contain a small condensing lens held in place by a plate 42, having a pair of parallel ribs 43 projecting slightly above the surface of the plate and slightly above the surface of the table 28. These ribs are spaced apart so as to engage the film in the margins on each side of each convolution of the pictures, so that the picture portion of the film will be guarded against wear. An opening 44 is provided between the ribs 43 communicating with the opening 41 and through which the projecting beam passes. A bracket 45 is secured to the top of the frame 27 and carries a revoluble shutter 46, together with the driving mechanism 47 thereof. The shutter is located to rotate over the opening 41 and to periodically interrupt the beam of light issuing therefrom in the well known manner and for the well known reasons. An arm 48 is pivotally mounted at one end on this bracket and carries toward its opposite end a projecting lens 49, which is normally positioned in alignment with the aperture 41 and below the path of the shutter as clearly shown in Figure 3. In order to definitely fix the position of the lens and to hold the same against any movement due to vibration, the end of the arm 48 rests upon a bracket 50 carried by the frame 27 and is connected thereto by a cap screw 51, which is preferably of the wing head variety in order to facilitate removal without the necessity of employing tools. The arm 48 carries a presser foot 52, which is preferably in the form of a light, flat spring positioned to bear upon the film directly above the ribs 43. This presser foot is apertured for the passage of the light beam and the aperture therein serves to determine the shape and size of the picture. The presser foot therefore serves as a framing device. This presser foot is mounted on the arm 48 by means of a pivot pin 53.

Immediately under the aperture 41 of the frame, a bracket 54 is provided carrying a reflecting prism 55 adapted to deflect a beam of light from horizontal to vertical. In the form of the device illustrated, which has been reduced in size as much as possible, the source of light is located either inside or outside the cabinet 11 at one end of the frame 27 and the light rays are passed through a condensing lens 56, which directs a horizontal beam of small diameter and intense brilliancy upon one of the faces of the prism 55. The light is then deflected by the prism upwardly through the aperture 41, through the plate 42 and film, and through the projecting lens 49 on to the mirror 23, which when properly adjusted again deflects the beam on to the screen 15. By sacrificing a small degree of compactness, a light of sufficient power may be disposed in the same location as the prism 15, thus eliminating the very considerable losses incident to the use of the prism. In order to revolve and position the film, a shifting mechanism is provided for the disc 35 comprising a sprocket 57 engaging the disc from above and meshing with the apertures thereon, and a table 58 to hold the disc up to and in mesh with the sprocket. The table is vertically slidable on any suitable form of support 59 and is normally pressed upwardly by a spring 60. A lever 61 is provided having cam engagement with the table to depress the table upon movement of the lever in one direction, as will be clearly seen in Figure 1. The lever is normally restrained from such table depressing movement by any suitable means such as an extension 62 of the spring 60 fulcrumed over the lever pivot and connected to the lever. The grip of the shifting device on the disc 35 is sufficient to hold the disc against the urge of the spring 36 and the resetting device 38, but when it is desired to reset the film, the lever 61 is oscillated and depresses the table, so that the disc 35 drops away from its positioning sprocket 57 and is free to revolve. In order to free the film from the pressure of the foot 52, any suitable form of linkage 63 is provided between the lever 61 and the presser foot to lift the foot away from the film when the disc 35 is released from the sprocket 57. The movement of the disc and film by the sprocket is comparatively slow and there is substantially no friction between the film and its supporting table 28 but, when the disc and film are released, the movement imparted by the resetting device is quite rapid and considerable friction would apparently develop between the film and table. It is found, however, that by the use of a highly polished table and by the slight projection of the ribs 43 above the table holding the film up and admitting air between it and the table, that the rapid revolution of the film induces a flow of air between it and the table upon which the film virtually floats. In order to simplify the operation of the machine, the lever 61 may be operated automatically on the opening of the casing door 64 for the purpose of changing a film by providing any suitable linkage 65 between the door and lever. To further facilitate the operation of the machine, lights 66 may be provided in the upper and lower compartments and controlled by a switch 67 adapted to be operated automatically by the opening and closing of the door 64.

The sprocket 57 is operated in an integrating manner and the movement of the disc and film thereby controlled as desired, by means of mechanism mounted in a casing 68 carried by the frame 27. This casing is preferably oil tight and filled with any suitable lubricant, so that the gearing will run very smoothly and silently. The spindle 69 carrying the sprocket 57 enters the casing through an oil-tight bearing 70 and is supported at its inner end by an adjustable pivot 71. The spindle carries a pair of pinions 72 and 73 fixed thereon, the first pinion meshing with a specially designed worm wheel 74 fixedly mounted on a revoluble shaft 75. The second pinion 73 is engaged by a detent 76 carried by a lever 77 pivoted in the casing and engaging a cam 78 mounted on the shaft 75 and held in engagement with the cam by a spring $78^a$. The shaft 75 is driven preferably by worm or spiral gears 79 from a drive shaft 80. As shown in Figure 1, this drive shaft is flexible and connects with an electric motor 81, the shaft being flexible both to facilitate placing of the motor and to avoid transmission of motor vibrations to the gear. One end of the shaft 75 passes out of the casing through an oil-tight stuffing-box 82, while the other end is supported in the casing by a pivot $82^a$. As the pictures appearing on the film are very small, it follows that the positioning of these pictures under the projecting lens must be very accurate, otherwise the picture will appear to jump around on the screen. For this reason, the workmanship of the parts 72, 73 and 74 must be very accurate and the adjustment of the parts must be such that there is no slack motion or free play in any direction. For this reason, the adjustable pivots 71 and $82^a$ are provided and, to permit a further accurate setting of the shaft 75, a ball thrust bearing 83 may be provided between the gears 79 and a plate 84 adjustable externally of the casing by set screws 85. It will thus be seen that all end play in the shaft may be taken up so that any unforeseen movement of the pinion 72 and therefore of the shaft 69 will be avoided. To further safeguard against minute movements of the shaft 69, the detent 76 is provided to engage the pinion 73 and intermittently lock the shaft against movement. As clearly shown in Figure 5, this detent will wedge tightly between the teeth of the pinion under the influence of the spring 78ª and will be lifted at proper times by passage of the cam 78 under the lever 77. The worm wheel 74 which meshes with and operates the pinion 72 must necessarily have a certain amount of play in order to work freely and it is this small amount of play which would interfere with the projecting of a good picture. The detent being, however, normally stationary engages tightly with the pinion 73 and holds the shaft 69 and sprocket 57 absolutely rigid except when the film is being shifted. The worm wheel 74 is peculiar in that the groove thereof is not a helix but is, with the exception of one small portion, arranged in a single plane. In this small portion, the two ends of the groove extend parallel with one another as in an ordinary worm. The effect, as will be readily understood from Figure 5, is that on each revolution of the worm the pinion 72 will be revolved through the distance between adjoining teeth, this movement of the pinion occurring all at one time and the pinion then standing still during the remainder of worm revolution. The teeth of the pinion 72 and of the sprocket 57 are preferably pointed or bullet-shaped and made of very hard material so as to resist wear. The pointed teeth of the sprocket 57 enter easily the apertures of the disc and rotate the disc, the centre to centre distance between adjacent apertures, and then settle well into the apertures so that the same are accurately centered relatively to the axis of the engaging tooth. The apertures of the disc and the pictures of the film are arranged in a true spiral, so that each aperture is a minute distance nearer to or farther away from the centre of the disc than the apertures on each side of it. This distance is so small that the pointed teeth of the sprocket 57 readily shift the disc bodily a small amount at each partial revolution. This arrangement eliminates the complication incident to providing a special mechanism to move the disc bodily. It has been found by experiment that a good grade of vulcanized fibre is the most satisfactory material for the disc, as it provides a silent, practically frictionless driving means in which the enlargement of the apertures with use is found to be much less than in a metal disc. The disc being flexible has the advantage that it may be very easily disconnected from the sprocket as already described. It will be readily understood that the cam 78 is set in such relation to the throw of the worm wheel that the detent 76 will be withdrawn immediately before the worm commences to revolve the pinion 72 and will be returned into engagement with the pinion 73 immediately the revolution stops.

The end of the shaft 75 which projects from the gear case 68 carries a sprocket wheel 86, which drives through a belt or chain 87 a sprocket 88 on the shutter drive 47. A second sprocket 89 is connected to the first and drives by means of a belt or chain 90 the driving sprocket 20 of the gramophone. It has been found that the best results are obtained as to positive drive and silence by using pin tooth sprockets and perforated leather belts.

The control of the motor is both manual and automatic. The speed control lever 91 of the gramophone is connected by a link 92 with a crank shaft 93 journalled in the casing 11, which in turn operates a motor speed regulator 94. The automatic regulation comprises a motor cut-out switch 95 of any suitable type mounted upon the arm 29 and adapted to be operated by the movement of the nut 40. When the film has been rotated a sufficient number of revolutions to carry the entire spiral series of pictures past the projecting point, the nut 40 has reached the end of its travel and operates the switch 95 to open the motor circuit so that the mechanism is brought to a stop. In order to avoid burning the film, the circuit of the projecting lamp should be carried through the same switch or otherwise controlled, so as to be opened at the same time that the motor circuit is opened. The details of the switch 95 and of the means for opening and closing the lamp circuit are outside of the present invention and therefore have not been illustrated The lever 91 may serve of course to stop and start the motor but, for a variety of reasons, it will be advisable to provide a cut-out for the motor separate from the speed controller 94. When the motor is stopped, the film and disc are held by the sprocket 57 against return to the starting point by the automatic resetting means 36 and 38. As soon as the door 64 is opened for the purpose of changing a film, the disc 35 is automatically released as previously explained and the mechanism resets itself in a second or two.

The operation of the device is quite simple and it is thought will be readily understood from the foregoing description. The device may be operated independently as a gramophone or as a motion picture machine, or both may be operated together. Obviously, the record played on the gramophone need not correspond with the picture projected and, when such is the case, there is no necessity of synchronizing the two mechanisms. When, however, the picture is a visualization of a song or other matter on a gramophone record, the record should be marked in some way with a starting point which will be placed under the needle in the usual manner, so that when the machine is started the sound reproduction and the picture projection will start at the same instant. When records are to be synchronized with pictures, it is advisable that the sound record be clamped to the revolving table 16. When once properly set, the sound record and the picture will remain in synchronism, the driving connection between the two being designed to produce this result.

Having thus described my invention, what I claim is:—

1. A motion picture machine for use with films having pictures arranged thereon in a spiral series, comprising a pivoted arm, a spindle revoluble in the arm and adapted to carry a film, a disc carried by the spindle having apertures therein uniformly spaced and arranged in a spiral series, a toothed wheel positioned to engage the apertures of the disc to both rotate the disc and bodily move the same, and means operative upon disengagement of the disc and wheel to rotate the spindle and disc to return the disc to predetermined relation with respect to the wheel.

2. A motion picture machine for use with films having pictures arranged thereon in a spiral series, comprising a pivoted arm, a spindle revoluble in the arm and adapted to carry a film, a disc carried by the spindle having apertures therein uniformly spaced and arranged in a spiral series, a toothed wheel positioned to engage the apertures of the disc to both rotate the disc and bodily move the same, and resetting means automatically operative upon disengagement of the disc and wheel comprising means to rotate the disc and spindle, and means to swing the arm and bodily shift the disc.

3. A motion picture machine for use with films having pictures arranged thereon in a spiral series, comprising a pivoted arm, a spindle revoluble in the arm and adapted to carry a film, a disc carried by the spindle having apertures therein uniformly spaced and arranged in a spiral series, a toothed wheel positioned to engage the apertures of the disc to both rotate the disc and bodily move the same, means automatically operative upon disengagement of the disc and wheel to rotate the disc spindle and film thereon to a starting point, and means to limit the revolution of the disc spindle and film.

4. In a motion picture machine for use with a film having pictures thereon in a spiral, a swinging film support, means to simultaneously rotate a film and shift the axis thereof, and means operative to rotate the film in the opposite direction and shift the axis thereof to return the film to a starting point, means holding the film against such resetting action and means to release the holding means.

5. In a moving picture machine for use with a film having pictures arranged thereon in a spiral series, a casing including a door, means to cause the pictures of the spiral series on said film to successively pass a fixed projecting point, and means connected to said door automatically operative on opening of the door to shift the film to return the first picture of the series into register with the projecting point.

6. A motion picture projecting apparatus comprising a frame, an arm pivoted at one end to said frame, a spindle revolubly mounted at the other end of said arm, a film support on the spindle, a disc rigidly connected to said spindle having a series of apertures therein arranged in a spiral series, means to clamp a film to the disc and to position the film with pictures thereon in predetermined relation to the apertures of the disc, a spring drum mounted in said arm, a flexible member mounted on said drum and attached to the spindle and adapted to be wound upon the spindle by revolution thereof to wind up the spring drum, a toothed wheel meshing with the apertures of said disc and operative to rotate the disc and to bodily shift the same, thereby swinging the supporting arm, a spring operative to shift the arm and return the end of the spiral of apertures into register with the wheel, means to limit the movement of the arm under urgence of said spring, and means to limit the revolution of the disc spindle and film by said spring drum.

7. In combination with a device according to claim 6, means normally holding the disc in mesh with said wheel and holding the same from movement by said spring drum and spring, and means for shifting the holding means to release the parts for resetting by said spring drum and spring.

8. In combination with a device according to claim 6, a film support, a presser foot arranged to press film against the support, means to hold the disc in mesh with the toothed wheel, and means to simultaneously shift said disc holding means and presser foot.

9. In a motion picture machine for use with films having pictures arranged thereon in a spiral series, means to rotate a film and to bodily shift the same to cause pictures to successively pass a fixed projecting point, means to reversely rotate and shift said film to reset the first picture of the series to register with the projection point, means holding the film against the action of said resetting means, a cabinet containing the mechanism including a door giving access to a film on the machine, and connection between said door and the holding means operative on opening of the door to shift the holding means and release the film for automatic resetting.

10. A device according to claim 9, in which the film shifting means includes a motor in combination with means automatically operative by said film rotating means to open the circuit of said motor when the last picture of the series passes the projecting point, said circuit opening means being operative by the film resetting means to close the motor circuit.

11. In a motion picture machine, means for moving a film past a projecting point, an arm pivotally mounted at one extremity, a projecting lens carried at an intermediate point in the length of said arm, a bracket to support the opposite end of said arm, and means to clamp the arm to the bracket to support the lens against movement due to vibration, said clamping means being easily removable to release said arm whereby the lens may be swung away from the projecting point.

12. In a motion picture machine for use with films having pictures arranged thereon in a spiral series, means to revolve a film, a supporting table for the film having a highly polished film engaging surface, and means positioned to engage a film in the margin to slightly space the film from the supporting table, whereby an inlet is formed for the free entrance of air between the film and table to float a revolving film upon said table.

13. In a moving picture machine for use with films having pictures thereon in a spiral series, means to rotate a film including a flexible disc having a spiral series of apertures therein, a pinion to engage in the apertures of said disc, and means in register with the pinion engaging the disc on the opposite side thereof from the pinion to hold the disc in engagement with the pinion, said means being movable to release the disc for movement automatically to disengage from the pinion for resetting of the disc and film.

14. In a motion picture machine for use with films having pictures thereon in a spiral series, means to position and slidably hold a film in position for projection, means to rotate a film including a substantially horizontal flexible disc having a spiral series of apertures therein, a pinion above the disc to engage in the apertures thereof, and means engaging the disc from beneath to hold the disc up in engagement with the pinion, said means being movable to release the disc for automatic disengagement from the pinion for resetting of the disc and film, operative connection between the disc holding means and film holding means, whereby the two are simultaneously released for resetting, and means separate from the operating means for resetting the disc and film.

15. In a motion picture machine including a flexible disc having a spiral series of apertures, a pinion to engage the disc apertures, and means engaging the disc to hold the disc in engagement with the pinion, said means being movable to enable flexion of the disc to disengage the pinion for resetting of the disc and film.

16. In a moving picture machine for use with a film having pictures arranged thereon in a spiral series, a casing including a door, means to cause the pictures of the spiral series on said film to successively pass a fixed projecting point, and means connected to said door to shift the film to return the first picture of the series into register with the projecting point, a stop to limit the resetting movement, and an abutment for said stop operatively connected with the resetting means to be thereby positioned for engagement by the stop.

17. In a moving picture machine for use with a film having pictures arranged thereon in a spiral series, a casing including a door, means to cause the pictures of the spiral series on said film to successively pass a fixed projecting point, and means connected to said door to shift the film to return the first picture of a series into register with the projecting point, and a stop, an abutment to limit the resetting movement, and a positioning screw for said abutment operated by the film shifting means to position the abutment for operation.

18. In a motion picture machine, means for moving the pictures of a spiral series successively past the projecting point including a swinging film support, a disc thereon to move the support and rotate a film having a series of openings arranged in a spiral, a toothed wheel to engage such openings, means to normally maintain engagement of the wheel and disc, said means being movable to permit disengagement of the wheel and disc for resetting and resetting means separate from the operating means and operating automatically upon release of the disc to reset the disc and film.

19. In a motion picture machine, means for moving the pictures of a spiral series successively past the projecting point including a swinging film support, a disc thereon to move the support and rotate a film having a series of openings arranged in a spiral, a toothed wheel to engage such openings, means to normally maintain engagement of the wheel and disc, said means being movable to permit disengagement of the wheel and disc for resetting, a film table and film presser foot to accurately locate the film at the projection point, and operative connection between said disc releasing means and the presser foot to release the film during resetting.

20. In a motion picture machine, means for moving the pictures of a spiral series successively past the projecting point including a swinging film support, a disc thereon to move the support and rotate a film having a series of openings arranged in a spiral, a toothed wheel to engage such openings, means to normally maintain engagement of the wheel and disc, said means being movable to permit disengagement of the wheel and disc for resetting, rotating means for said wheel embodying a pinion, a cam to intermittently and partially rotate the pinion, a detent to accurately position and lock the wheel between periods of movement, and a cam to operate said detent.

21. In a motion picture machine for use with films having pictures thereon in a spiral series, means to rotate a film including a substantially horizontal flexible disc having a spiral series of apertures therein, a pinion above the disc to engage in the apertures of said disc, and means engaging the disc from beneath to hold the disc up in engagement with the pinion, said means being movable to release the disc for automatic disengagement from the pinion to permit resetting of the disc and film.

In witness whereof, I have hereunto set my hand.

WILLIAM H. BAKER.